UNITED STATES PATENT OFFICE.

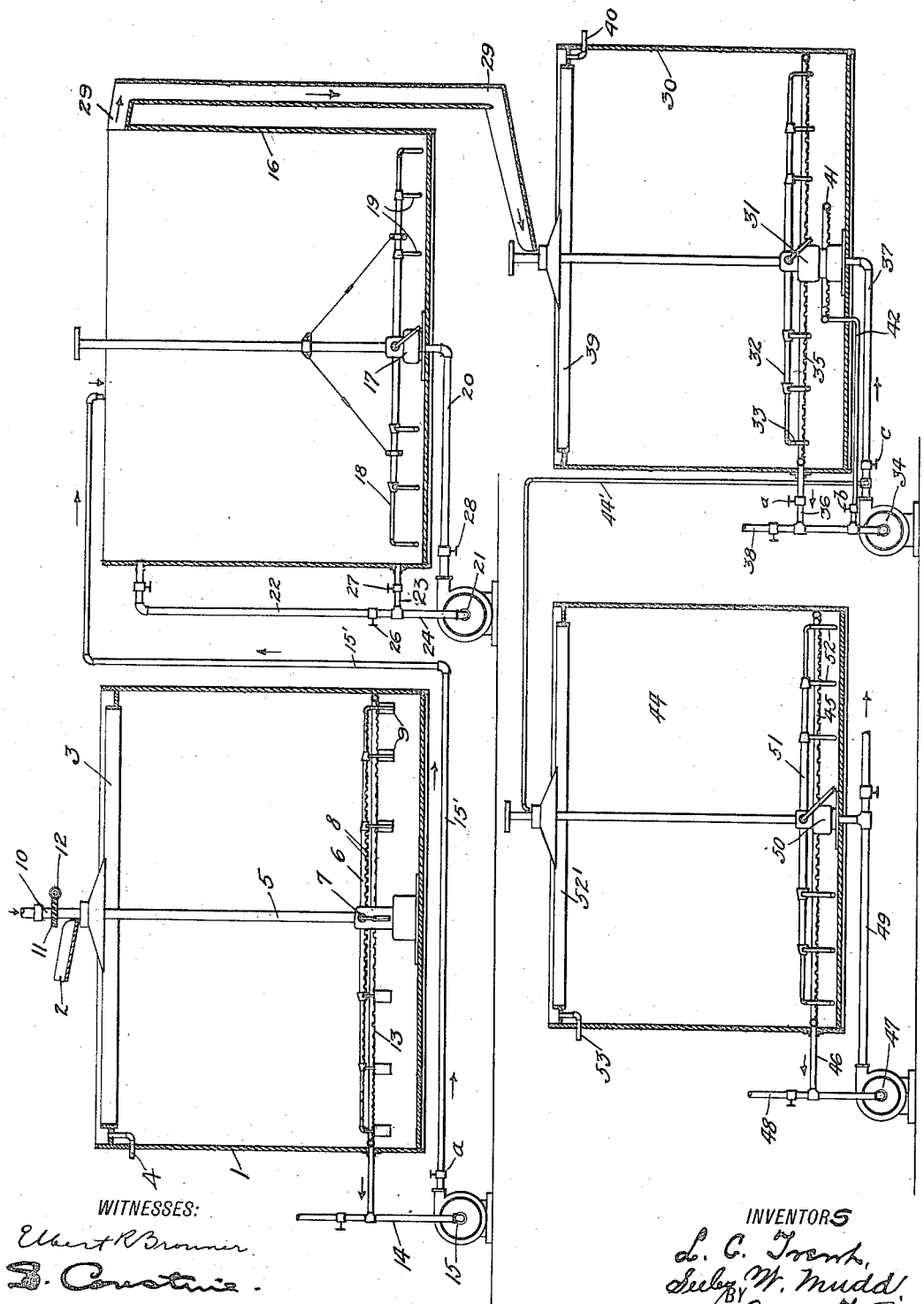

LAMARTINE C. TRENT AND SEELEY W. MUDD, OF LOS ANGELES, CALIFORNIA.

ORGANIZED APPARATUS FOR TREATING CYANID SLIMES.

1,283,365.  Specification of Letters Patent.  Patented Oct. 29, 1918.

Application filed August 24, 1914. Serial No. 858,415.

*To all whom it may concern:*

Be it known that we, LAMARTINE C. TRENT and SEELEY W. MUDD, citizens of the United States, residing at Los Angeles, in the county of Los Angeles and State of California, have invented certain new and useful Improvements in Organized Apparatus for Treating Cyanid Slimes, of which the following is a specification.

The hereinafter described invention relates to an improved organized apparatus for the continuous treatment of slimes and pulps for the recovery of values therefrom, more particularly ore and other mineral pulps in the treatment of which chemical solutions, water only or other solvents are used, and has been designed with special reference to the extraction of gold and silver from their ores with cyanid solutions. It has for its object to treat crushed or pulverized material delivered to it as slime or pulp from any appropriate source and to provide for the different stages of extraction and separation of values to finally include the delivery of valuable and recovered solutions for further treatment and the discharge of base tailings pulp, a further object being to dispense with the necessity of the employment of extensive filtering apparatus and by so doing eliminating the expense incidental thereto, while at the same time producing a simpler, more efficient and less expensive method of treatment than the ones in common use at the present time.

The invention consists in associated means for subjecting the slimes as received to a settling and thickening action in order to separate excess liquid contained therein, or to settling and the replacement of the carrier liquid with such other liquid as the case may require, removing the thickened material and subjecting it to agitation and circulation for dissolving values contained therein, subsequently treating the pulp by introducing a barren solution or a different liquid causing agitation in said material under treatment, the purpose being to add an active solvent for dissolving residual values and also to displace and replace pregnant solution therewith, and following this with a similar treatment of replacement of solution by means of water for the recovery of the solvent and its contained values, and for the separation of a tailings pulp which is practically freed from soluble values.

The apparatus may be said to comprise four instrumentalities, coöperating for thickening of the slimes and the removal of a part of the liquid therefrom, for subjecting the thickened slimes to agitation and circulation for the dissolving of values contained therein, for separating the valuable solutions from the solids by replacement with a solvent and finally for separating the liquid from the resulting pulp mixture by replacement with water; these interrelated instrumentalities coacting in successive steps being conducted as a single operation during the continuous flow of the material to be treated. The instrumentalities may be multiplied for carrying out each step, as described.

To comprehend the invention, reference should be had to accompanying drawings, wherein is disclosed in vertical section, the organized apparatus for the continuous treatment of material for the recovery of values therefrom.

In the drawings, the numeral 1 indicates a tank or vessel for the initial treatment of the pulverized material which is fed to the vessel as a slime in any suitable manner as by a launder 2, the said initial treatment being for settling and thickening the received slimes and for replacing liquid thereof with a solvent when required, the dimensions of the vessel being dependent on the tonnage capacity desired for the apparatus. The receiving vessel 1 is provided adjacent its upper edge with an overflow launder 3 for receiving separated clarified liquid, which is carried off through any suitable outlet 4, for disposal in any desired manner, said liquid when separated from slimes produced in the pulverization of ores in the presence of a solvent, frequently carrying high metallic values in solution.

Suspended at an adjustable height within the vessel 1 is a rotatable device consisting of a tubular shaft 5 which is closed at its lower end, and of hollow arms 6, which are connected to the shaft 5 by the hollow head 7, said arms 6 being each provided with one or more discharge openings 8 and a series of blades 9, a supply pipe 10 communicating with the upper end of a hollow shaft 5 for introducing a replacing liquid therein under pressure, the object of the device being to thicken the slimes, to introduce and distribute a liquid for replacing purposes and to produce the conditions desired for the replacement of the liquid received in the slimes for treatment, the discharge openings of the arms 6 and the setting of the blades 9 thereof being arranged in such a manner as to cause the agitation required for the mentioned purposes. The shaft 5 is mounted for rotation in any suitable manner, rotation being imparted to the shaft by the gear wheel 11, and worm and pulley 12.

The material is withdrawn from the vessel 1 through the perforated outlet pipe 13, which is connected through a pipe 14, with the lift pump 15, said pump delivering the withdrawn material through the pipe connection 15 into the agitating vessel 16. Within the vessel 16 adjacent the bottom thereof, is mounted for rotation an agitator comprising a hollow head 17, and hollow arms 18, each of which arms is provided with discharge nozzles 19, there being introduced into the head 17 a pipe 20, which connects with a rotary pump 21. The material within the vessel 16 is kept in constant agitation and circulation by means of the pump 21, material being withdrawn from the said vessel at its upper portion into the pump 21 by means of the connection 22, or from a point intermediate the ends of the vessel by means of the connection 23 through the suction pipe 24, the flow through the said pipe connections 22 and 23 being controlled by the valves 26 and 27 respectively. The material withdrawn from the vessel 16 into the suction pump 21 is returned to the said vessel 16 by means of the rotary agitator situated therein, the flow through pipe 20 leading to the agitator being regulated with a valve 28.

The material treated in the vessel 16 overflows therefrom into the launder 29, which conveys the said material to the replacing vessel 30, which is provided adjacent its bottom with a rotary agitator having a hollow head 31 suitably mounted for rotation and tubular arms 32 provided with discharge nozzles 33. Outside of the vessel 30 is located a suction pump 34, which withdraws material from within the said vessel 30 through the interiorly disposed perforated suction pipe 35 and pipe connections 36 and returns the said material into the vessel through the arms 32 of the agitator by means of the pipe 37, which said pipe delivers the material into the head 31 of the agitator. By this withdrawal and return of the material within the vessel 30, the said material is maintained in circulation and agitation while a replacing solvent is being added thereto through the valve controlled pipe 38 connected with the suction of the pump 34, for replacing pregnant solution and for dissolving residual values contained in the solids of the material under treatment, preferably but not necessarily with an upward flow of the replacing liquid within the vessel 30. The replaced and rising liquids separated within the vessel 30 are received in a discharge launder 39 and flow therefrom through an outlet 40 to a suitable place of deposit for after treatment. Situated near the bottom of the vessel 30 is a perforated suction ring 41, connected with a discharge pipe 42 and thence with the lift pump 34 for withdrawing the treated material from the vessel 30 and delivering it to the replacing vessel 44 through the pipe 44', the quantity of material withdrawn for circulation and discharge being controlled by the valves $a$ and $b$ in pipes 36 and 42, the pipe 37 also being provided with a valve $c$. In the vessel 44, the material withdrawn from the vessel 30 mixes with the replacing liquid and receives another treatment by replacement in which water is used as the replacing liquid to recover solution containing dissolved chemical and metallic values from the said material, the quantity of water introduced for replacing purposes being approximately the quantity which is discharged in the tailings pulp with such additional quantity as may be required in continuous operation to make up for losses of water in discarded solutions, evaporation and in other manner, this being the stage of treatment for introduction of the make-up water.

Agitation is produced in the vessel 44 in the same manner as described for vessel 30, by withdrawing material from near the bottom of the vessel through the perforated suction pipe 45 and the pipe connections 46 into the suction pump 47, the replacing water being introduced through the valve controlled pipe 48, and delivering the discharge of the pump by means of the pipe 49 to an agitator situated within the vessel 44, the material thus delivered by the pump passing through the agitator comprising the head 50 and the radial arms 51 provided with discharge nozzles 52 as in the preceding vessel 30. The liquid overflowing from the vessel 44 is discharged into a launder 52', passing therefrom through an outlet 53 to a place of deposit and the same is available for use in any desired manner, and the tailings may be discharged from the vessel as desired.

A decided advantage gained by the use of the described apparatus is that the metal values are removed as soon as possible after they are dissolved, providing a more efficient and economical recovery than otherwise possible.

We are aware that changes may be made in the arrangement of the working parts herein illustrated and described, and we do not wish to be understood as confining ourselves to such details of construction.

Having thus described the invention what is claimed as new and desired to protect by Letters Patent is:—

1. An organized apparatus for the treatment of mixtures of solids and liquids containing metal values to be separated therefrom, the same comprising a settling vessel, agitating means in the settling vessel, means for introducing replacing liquid therein, means for carrying off clarified liquid, an agitating vessel, means for withdrawing the thickened material from the settling vessel and delivering the same to the agitating vessel, devices for agitating and circulating the material in the agitating vessel, a replacing vessel, means for delivering material from the agitating vessel to the replacing vessel, agitating means in the replacing vessel, means for introducing a replacing liquid in the replacing vessel, means for removing clarified liquid from the replacing vessel, a fourth vessel, means for removing treated pulp from the last mentioned replacing vessel and delivering the same to said fourth vessel, means for introducing water into the fourth vessel for replacement purposes, agitating means in the fourth vessel, and means for removing clarified liquid and tailings pulp from the fourth vessel.

2. An organized apparatus for the treatment of mixtures of solids and liquids containing metal values to be separated therefrom, the same comprising a settling vessel, an agitating vessel, and a replacing vessel, means for imparting agitation to the material within the agitating and replacing vessels, means at the upper portion of the first mentioned vessel, for carrying off clear liquid, a connection for withdrawing material therefrom and delivering it to the agitating vessel, a pump connected with the second vessel for withdrawing material from and returning the same thereto for circulation within the vessel, means for delivering the treated material from the agitating vessel to the third of the series of vessels, a pump for withdrawing and returning material for circulation in the replacing vessel, and means for introducing a replacing liquid in the replacing vessel.

3. An organized apparatus for the treatment of mixtures of solids and liquids containing values to be separated therefrom, the same comprising agitating and replacing vessels, rotary agitating means in the said vessels, pumps connected with each of the said vessels for withdrawing material therefrom and returning it to the vessel from which it was withdrawn for purposes of circulation, connections for introducing another liquid into the circulating material within the replacing vessels, means for effecting the transfer of the heavy material under treatment from each to the succeeding vessel, and for final disposal from the last vessel of the series, and means for withdrawing clarified liquids.

4. An organized apparatus for the treatment of mixtures of solids and liquids containing metal values to be separated therefrom, the same comprising a settling vessel, an agitating vessel and a replacing vessel, agitating means in each vessel, a pump connected with the first vessel for withdrawing material therefrom and delivering the same to the agitating vessel, means for admitting a barren liquid through said pump into the settling vessel, an overflow launder at the upper portion of the vessel, a pump connected with the second vessel for withdrawing therefrom and returning the material thereto, means for delivering material from said vessel to the third of the series of vessels, a pump connected to said third vessel for withdrawing and returning material thereto, and means for supplying barren liquid to the last mentioned vessel through said pump.

5. An organized apparatus for the treatment of mixtures of solids and liquids containing values to be separated therefrom, the same comprising a series of vessels, means within each of said vessels for imparting agitation to the material under treatment therein while introducing replacing liquid, forming zones of separation during said agitation, and means for withdrawing pulp under treatment from each vessel to another of the vessels.

6. An organized apparatus for the treatment of slimes and liquids containing metal values to be separated therefrom, the same comprising a settling vessel, means for agitating the material in the settling vessel, an agitator vessel, means for withdrawing the thickened material from the first vessel and discharging the same into the second vessel, devices in the last named vessel for agitating the material discharged therein, a replacing vessel, means for delivering the material from the agitating vessel to the replacing vessel, an agitating device in the replacing vessel, a pump connected with said replacing vessel for withdrawing material therefrom and returning the same thereto for maintaining circulation of material within the vessel, and means for introducing into said replacing vessel a replacing liquid.

7. An organized apparatus for the treatment of mixtures of solids and liquids containing values to be separated therefrom, the same including a settling vessel, an agitating vessel, a replacing vessel, agitating means in the agitating and replacing vessels, means for withdrawing thickened material from the settling vessel and delivering the same to the top of the agitating vessel, means for conveying the material from the top of the agitating vessel and delivering the same to the top of the replacing vessel, means for withdrawing clarified liquid from the replacing vessel, and means for discharging pulp from said vessel.

In testimony whereof we have signed our names to this specification in the presence of two subscribing witnesses.

LAMARTINE C. TRENT.
SEELEY W. MUDD.

Witnesses:
F. H. PEYTON,
M. L. BRYANT.